(12) United States Patent
Lian et al.

(10) Patent No.: US 12,441,156 B2
(45) Date of Patent: Oct. 14, 2025

(54) VEHICLE THERMAL MANAGEMENT SYSTEM AND ELECTRIC VEHICLE

(71) Applicant: BYD COMPANY LIMITED, Guangdong (CN)

(72) Inventors: Yubo Lian, Shenzhen (CN); Yilin Zhong, Shenzhen (CN); Heping Ling, Shenzhen (CN); Chunfen Wu, Shenzhen (CN); Fangfang Lin, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 248 days.

(21) Appl. No.: 18/027,499

(22) PCT Filed: Sep. 18, 2021

(86) PCT No.: PCT/CN2021/119447
§ 371 (c)(1),
(2) Date: Mar. 21, 2023

(87) PCT Pub. No.: WO2022/057936
PCT Pub. Date: Mar. 24, 2022

(65) Prior Publication Data
US 2023/0373264 A1 Nov. 23, 2023

(30) Foreign Application Priority Data
Sep. 21, 2020 (CN) .......................... 202022094143.7

(51) Int. Cl.
*B60H 1/00* (2006.01)
*B60H 1/03* (2006.01)
(Continued)

(52) U.S. Cl.
CPC .......... *B60H 1/00278* (2013.01); *B60H 1/03* (2013.01); *H01M 10/625* (2015.04);
(Continued)

(58) Field of Classification Search
CPC ...... B60H 1/00278; B60H 1/03; B60H 1/143; B60H 1/00921; B60H 1/32281;
(Continued)

(56) References Cited

U.S. PATENT DOCUMENTS

| 11,745,561 B2 * | 9/2023 | Hasegawa | H01M 10/625 62/238.6 |
| 11,964,536 B2 * | 4/2024 | Iino | B60H 1/3204 |

(Continued)

FOREIGN PATENT DOCUMENTS

| CA | 2778026 A1 * | 11/2012 | ............ B60H 1/143 |
| CN | 205970883 U | 2/2017 | |

(Continued)

OTHER PUBLICATIONS

CN 208931069U Machine Translation (Year: 2019).*
International Search Report and Written Opinion for Application No. PCT/CN2021/119447, mailed on Dec. 22, 2021, 12 pages.

*Primary Examiner* — Len Tran
*Assistant Examiner* — Gustavo A Hincapie Serna
(74) *Attorney, Agent, or Firm* — Sheppard Mullin Richter & Hampton LLP

(57) ABSTRACT

A system for thermal management, includes a first thermal management system including a compressor and a battery pack, and a second thermal management system including a heat sink, a heat exchanger, and a waste heat utilization branch for a high-voltage system. A water pump and a high-voltage system cooling branch passing through the high-voltage system are disposed on the waste heat utilization branch. A cooling liquid outlet of the heat exchanger communicates with an inlet of the waste heat utilization branch. An outlet of the waste heat utilization branch communicates with a cooling liquid inlet of the heat exchanger. A direct-cooling device is disposed on the battery pack. An outlet of the compressor communicates with a first port of (Continued)

the direct-cooling device. A second port of the direct-cooling device communicates with a refrigerant inlet of the heat exchanger. A refrigerant outlet of the heat exchanger communicates with an inlet of the compressor.

18 Claims, 6 Drawing Sheets

(51) Int. Cl.
  H01M 10/625 (2014.01)
  H01M 10/63 (2014.01)
  H01M 10/6569 (2014.01)
  H01M 10/66 (2014.01)
(52) U.S. Cl.
  CPC ....... *H01M 10/63* (2015.04); *H01M 10/6569* (2015.04); *H01M 10/66* (2015.04); *H01M 2220/20* (2013.01)
(58) Field of Classification Search
  CPC ......... B60H 1/323; B60H 2001/00307; H01M 10/625; H01M 10/63; H01M 10/6569; H01M 10/66; H01M 2220/20; H01M 10/6556; H01M 10/6568; H01M 10/613; B60L 58/26
  USPC .......................................... 165/42
  See application file for complete search history.

(56) References Cited

U.S. PATENT DOCUMENTS

| | | | | |
|---|---|---|---|---|
| 2013/0269911 A1* | 10/2013 | Carpenter | ............... | B60H 1/004 165/104.19 |
| 2014/0208775 A1* | 7/2014 | Styles | ................... | F25B 29/003 62/56 |
| 2015/0174986 A1* | 6/2015 | Satzger | .............. | B60H 1/00921 165/41 |
| 2016/0351981 A1* | 12/2016 | Porras | ................ | H01M 10/6569 |
| 2018/0086224 A1* | 3/2018 | King | .................. | H01M 10/663 |
| 2018/0178615 A1* | 6/2018 | Xia | ...................... | H01M 10/486 |
| 2019/0070924 A1* | 3/2019 | Mancini | ............. | B60H 1/32281 |
| 2019/0165438 A1 | 5/2019 | Kim | | |
| 2019/0176572 A1* | 6/2019 | Kim | ................... | B60H 1/00428 |
| 2019/0351732 A1* | 11/2019 | Rajaie | ................ | B60H 1/00392 |
| 2019/0366800 A1* | 12/2019 | Durrani | .............. | B60H 1/00921 |
| 2020/0180391 A1* | 6/2020 | Kim | .................... | B60H 1/00278 |
| 2020/0189357 A1* | 6/2020 | Chopard | ........... | B60H 1/00499 |
| 2020/0220236 A1* | 7/2020 | Durrani | .............. | H01M 10/667 |
| 2020/0247212 A1* | 8/2020 | Bara | ........................ | B60H 1/10 |
| 2020/0317026 A1* | 10/2020 | Kitamura | ........... | B60H 1/00899 |
| 2020/0353795 A1* | 11/2020 | Choi | .................. | B60H 1/00278 |
| 2020/0361280 A1* | 11/2020 | Hashimoto | ........ | B60H 1/00885 |
| 2020/0398636 A1* | 12/2020 | He | ..................... | B60H 1/00507 |
| 2021/0122263 A1* | 4/2021 | Dziubinschi | ...... | H01M 10/6554 |
| 2021/0237533 A1* | 8/2021 | Shimauchi | ........... | B60H 1/3205 |
| 2021/0252942 A1* | 8/2021 | Jeong | ........... | B60H 1/3213 |
| 2021/0370799 A1* | 12/2021 | Li | ..................... | H01M 10/6568 |
| 2021/0387548 A1* | 12/2021 | Li | .......................... | B60L 58/26 |
| 2022/0176774 A1* | 6/2022 | Tang | ................. | B60H 1/00485 |
| 2022/0203863 A1* | 6/2022 | Wu | ...................... | G01R 31/3648 |
| 2022/0212518 A1* | 7/2022 | Tan | ..................... | B60H 1/32284 |
| 2022/0258570 A1* | 8/2022 | Ishizeki | ............. | B60H 1/00385 |
| 2022/0410652 A1* | 12/2022 | Hayase | .................. | B60K 11/02 |
| 2023/0118870 A1* | 4/2023 | Eser | ........................ | B60K 1/00 165/96 |
| 2023/0322048 A1* | 10/2023 | Durrani | ............. | B60H 1/00278 62/115 |
| 2023/0391160 A1* | 12/2023 | Wang | .................... | B60H 1/034 |

FOREIGN PATENT DOCUMENTS

| | | | | |
|---|---|---|---|---|
| CN | 108621743 A | * | 10/2018 | ......... B60H 1/00278 |
| CN | 108859654 A | | 11/2018 | |
| CN | 109649114 A | * | 4/2019 | ......... B60H 1/00385 |
| CN | 208931069 U | * | 6/2019 | |
| CN | 111591108 A | * | 8/2020 | ......... B60H 1/00385 |
| CN | 113263889 A | * | 8/2021 | ......... B60H 1/00278 |
| CN | 213920593 U | | 8/2021 | |
| CN | 213920594 U | | 8/2021 | |
| DE | 102009028648 A1 | * | 2/2011 | ......... H01M 8/04007 |
| DE | 102017202472 A1 | * | 8/2018 | ............. B60H 1/323 |
| EP | 3689647 A1 | * | 8/2020 | ............. B60H 1/143 |
| FR | 3012584 A1 | * | 5/2015 | ............. B60H 1/323 |
| JP | 2001147055 A | | 5/2001 | |
| JP | 2008308080 A | * | 12/2008 | ............. B60L 58/24 |
| JP | 2012-111251 A | | 6/2012 | |
| JP | 2013038998 A | | 2/2013 | |
| JP | 2020040431 A | | 3/2020 | |
| KR | 2014-0091187 A | | 7/2014 | |
| WO | WO-2013039047 A1 | * | 3/2013 | ......... B60H 1/00278 |
| WO | WO-2013047488 A1 | * | 4/2013 | ......... B60H 1/00278 |
| WO | 2019/138731 A1 | | 7/2019 | |

* cited by examiner

VEHICLE THERMAL MANAGEMENT SYSTEM AND ELECTRIC VEHICLE

CROSS-REFERENCE TO RELATED APPLICATIONS

This application is a National Phase Application of International Patent Application No. PCT/CN2021/119447, filed on Sep. 18, 2021, which is based on and claims priority to and benefits of Chinese Patent Application No. 202022094143.7, filed on Sep. 21, 2020. The entire content of all of the above-referenced applications is incorporated herein by reference.

FIELD

The present disclosure relates to the air conditioning field of electric vehicles, and more specifically, to a vehicle thermal management system and an electric vehicle.

BACKGROUND

In a vehicle, especially an electric vehicle and a hybrid vehicle, in order to ensure the driving range, the service life, and the available power of the electric vehicle and the hybrid vehicle, it is necessary to manage the temperature of the power battery of the vehicle, so that the power battery always operates at a suitable temperature. In the related art, a battery heat exchange circuit is provided for heating the battery pack, and a PTC for heating a cooling liquid, a water pump for promoting circulation of the cooling liquid, and a heat exchanger provided at the battery pack for heat exchange with the battery pack are provided in the battery heat exchange circuit. The cooling liquid in the circuit is heated by the PTC in the circuit, and then the battery is heated. The battery is cooled by the heat exchange between the cooling liquid in the heat exchanger at the battery package and a refrigerant in an air conditioning system. When the battery is cooled, the PTC in the circuit is turned off. Such a thermal management system for the battery pack is completed by an additionally designed battery heat exchange circuit, which has complex pipeline arrangement, more parts and components, and higher costs.

SUMMARY

The present disclosure provides a vehicle thermal management system, which can simplify pipelines arrangement for cooling and heating a battery pack and reduce the cost.

In order to achieve the above object, the present disclosure provides a vehicle thermal management system, including a first thermal management system and a second thermal management system for a high-voltage system. The second thermal management system includes a heat sink, a heat exchanger, and a waste heat utilization branch. The waste heat utilization branch is provided with a water pump and a high-voltage system cooling branch passing through the high-voltage system that are interconnected. A cooling liquid outlet of the heat exchanger communicates with an inlet of the waste heat utilization branch, and an outlet of the waste heat utilization branch optionally communicates directly with a cooling liquid inlet of the heat exchanger or via the heat sink with the cooling liquid inlet of the heat exchanger.

The first thermal management system includes a compressor and a battery pack provided with a direct-cooling device. An outlet of the compressor communicates with a first port of the direct-cooling device of the battery pack, a second port of the direct-cooling device of the battery pack communicates with a refrigerant inlet of the heat exchanger via a first throttle branch, and a refrigerant outlet of the heat exchanger communicates with an inlet of the compressor.

According to the above technical solutions, at least the following technical effects can be achieved.

Since the battery pack is provided with a direct-cooling device, the heat exchange between the refrigerant and the battery pack is completed through the direct-cooling device. Therefore, it is unnecessary to arrange, on the battery pack, an additional heat exchanger and pipelines communicating with the additional heat exchanger for cooling the battery pack, which simplifies the pipeline arrangement for heating and cooling the battery pack and reduces the cost. The refrigerant is directly used to exchange heat for the battery pack, which has high heat exchange efficiency and is not affected by the external environment. No matter in a high-temperature or low-temperature environment, the battery pack can operate within a suitable temperature range, which improves the charging and discharging efficiency of the battery pack, improves the endurance, extends the service life of the battery pack, and ensures the safety of the battery pack.

According to another aspect of the present disclosure, an electric vehicle is provided, including the vehicle thermal management system described in any of the above.

Other features and advantages of the present disclosure are to be described in detail in the following part of detailed description.

BRIEF DESCRIPTION OF THE DRAWINGS

The accompanying drawings provide further understanding of the present disclosure and constitute a part of this specification. The accompanying drawings and the specific implementations below are used together for explaining the present disclosure rather than constituting a limitation on the present disclosure. In the accompanying drawings.

DESCRIPTIONS OF REFERENCE NUMERALS

Figure 1:
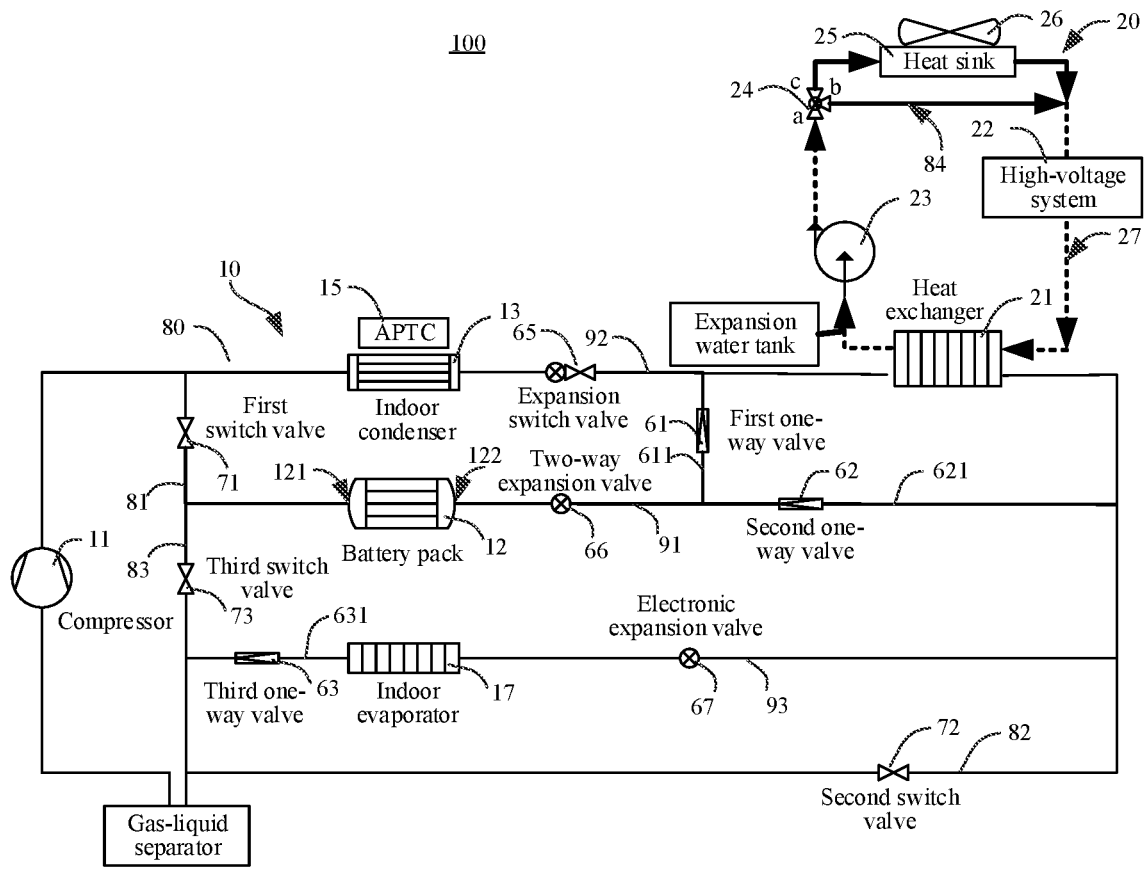
FIG. 1 is a schematic diagram of a circulation circuit of a vehicle thermal management system according to an implementation of the present disclosure, where a waste heat utilization branch is shown by a dashed arrow.

Vehicle thermal management system 100; First thermal management system 10; Compressor 11; Battery pack 12; First port 121; Second port 122; In-vehicle condenser 13; Heater 15; In-vehicle evaporator 17; Second thermal management system 20; Heat exchanger 21; High-voltage system cooling branch 22; Water pump 23; Reversing valve 24; Heat sink 25; Fan 26; Waste heat utilization branch 27; Bi-directional expansion assembly 50; Fourth check valve 51; Fifth check valve 52; Sixth check valve 53; One-way expansion valve 54; Seventh check valve 55; First check valve 61; First one-way branch 611; Second check valve 62; Second one-way branch 621; Third check valve 63; Third one-way branch 631; Expansion switch valve 65; Bi-directional expansion valve 66; Electronic expansion valve 67; First switch valve 71; Second switch valve 72; Third switch valve 73; First branch 80; First flow branch 81; Second flow branch 82; Third flow branch 83; Fourth flow branch 84; First throttle branch 91; Second throttle branch 92; Third throttle branch 93; Valve body 500; Inlet 501; Outlet 502; First valve core 503; Second valve core 504; Throttle port 505; Valve seat 510; First valve housing 511; Second valve housing 512; First electromagnetic driving portion 521; Second electromagnetic driving portion 522; First motor electric control circuit 101; Second motor electric control circuit 102.

DETAILED DESCRIPTION

Specific implementations of the present disclosure are described in detail below with reference to the accompanying drawings. It should be understood that the specific implementations described herein are merely used to describe and explain the present disclosure, but does not limit the present disclosure.

In the present disclosure, unless stated to the contrary, directional words such as "upstream and downstream" are used relative to a flow direction of a refrigerant. Specifically, the flow direction towards the refrigerant is downstream, and the flow direction away from the refrigerant is upstream. "Inside and outside" mean inside and outside of a contour of a corresponding component.

In the present disclosure, an electric vehicle may include a pure electric vehicle, a hybrid vehicle, and a fuel cell vehicle. FIG. 1 is a schematic structural diagram of a vehicle thermal management system 100 according to an implementation of the present disclosure. As shown in FIG. 1, the system may include a heating ventilation and air conditioning (HVAC) assembly and a damper mechanism (not shown). The damper mechanism includes an air duct that may be used to conduct air an in-vehicle evaporator 17 and an in-vehicle condenser 13.

In order to simplify the pipeline for cooling and heating a battery pack 12, in an implementation of the present disclosure, as shown in FIG. 1, a vehicle thermal management system 100 is provided, including a first thermal management system 10 and a second thermal management system 20 for a high-voltage system. The second thermal management system 20 includes a heat sink 25, a heat exchanger 21, and a waste heat utilization branch 27 (shown by dashed arrows in FIG. 1 and FIG. 2). A high-voltage system cooling branch 22 passing through the high-voltage system and a water pump 23 are connected with each other and are arranged on the waste heat utilization branch 27. A cooling liquid outlet of the heat exchanger 21 communicates with an inlet of the waste heat utilization branch 27, an outlet of the waste heat utilization branch 27 may communicate directly with a cooling liquid inlet of the heat exchanger 21 through a fourth flow branch 84 or with the cooling liquid inlet of the heat exchanger 21 through the heat sink 25. The water pump 23 arranged on the waste heat utilization branch 27 provides circulating power for the whole second thermal management system 20. The second thermal management system 20 further includes a reversing valve 24. Through the reversing valve 24, the outlet of the waste heat utilization branch 27 may communicate directly with the cooling liquid inlet of the heat exchanger 21 or with the cooling liquid inlet of the heat exchanger 21 through the heat sink 25.

The first thermal management system 10 includes a compressor 11 and a battery pack 12 provided with a direct-cooling device. An outlet of the compressor 11 communicates with a first port 121 of the direct-cooling device of the battery pack 12. A second port 122 of the direct-cooling device of the battery pack 12 communicates with a refrigerant inlet of the heat exchanger 21 through a first throttle branch 91, and a refrigerant outlet of the heat exchanger 21 communicates with an inlet of the compressor 11.

Figure 2:
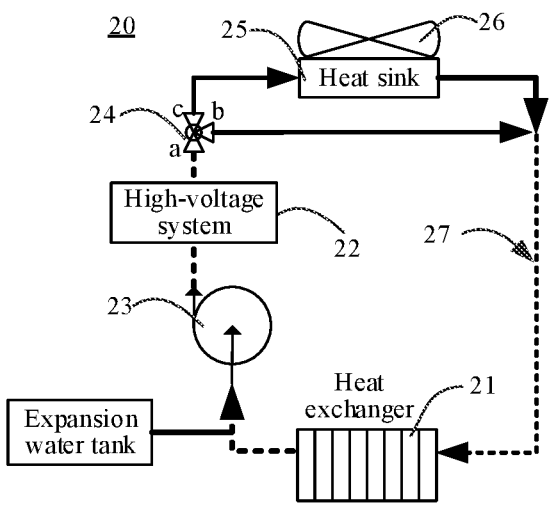
FIG. 2 is a schematic diagram of a circulation circuit of a second thermal management system according to another implementation of the present disclosure, where a waste heat utilization branch is shown by a dashed arrow.

In the present disclosure, the upstream and downstream sequence of the water pump 23, the heat exchanger 21, and the high-voltage system cooling branch 22 is not limited. For example, as shown in FIG. 1, the high-voltage system cooling branch 22, the heat exchanger 21, and the water pump 23 are arranged in sequence in a flow direction of a cooling liquid. In another embodiment, as shown in FIG. 2, the heat exchanger 21, the high-voltage system cooling branch 22, and the water pump 23 are arranged in sequence in the flow direction of the cooling liquid, or the water pump 23, the heat exchanger 21, and the high-voltage system cooling branch 22 are arranged in sequence in the flow direction of the cooling liquid, or the high-voltage system cooling branch 22, the water pump 23, and the heat exchanger 21 are arranged in sequence in the flow direction of the cooling liquid, and so on. In the present disclosure, for the convenience of explanation and description, the arrangement mode shown in FIG. 1 is used as an example for description.

In the above technical solutions, a high-voltage system includes devices operating at high voltages such as a motor, a motor controller, and a three-in-one charging and distribution unit. Since the devices operate at a high voltage, a lot of heat may be generated during the operation. The heat exchanger 21 is provided with four inlet and outlet port in total, which are respectively a refrigerant inlet and a refrigerant outlet for circulation of a refrigerant, and a cooling liquid inlet and a cooling liquid outlet for circulation of the cooling liquid.

The heat sink 25 in the present disclosure functions as a heat exchanger and can exchange heat with the external environment. When the vehicle thermal management system 100 needs heating, the heat sink 25 can absorb heat from the external environment, and when the vehicle thermal management system 100 needs cooling, the heat sink 25 can dissipate heat to the external environment.

In order to prevent damage to the compressor 11, the vehicle thermal management system 100 in the present disclosure further includes a gas-liquid separator. An outlet of the gas-liquid separator communicates with the inlet of the compressor 11, and all branches that need to communicate with the inlet of the compressor 11 need to pass through the gas-liquid separator and then enter the compressor 11. In this way, the refrigerant may first be subjected to gas-liquid separation through the gas-liquid separator, and the separated gas flows back to the compressor 11, thereby preventing the liquid refrigerant from entering the compressor 11 and damaging the compressor 11, so as to extend the service life of the compressor 11 and improve the efficiency of the whole heat pump air conditioning system.

In the above second thermal management system 20, the reversing valve 24 may be used for switching to change a flow path of the cooling liquid to cause the cooling liquid to flow through the heat sink 25 or not, so that the second thermal management system 20 includes two operating modes: a high-voltage system waste heat utilization mode and a high-voltage system waste heat+external environment energy mode. In the external environment energy mode, when it is necessary to absorb heat from the external environment, the operating mode is a mode of absorbing external environment energy. When it is necessary to release heat to the external environment, the operating mode is a mode of releasing energy to the external environment.

When the second thermal management system 20 is in the high-voltage system waste heat utilization mode, referring to FIG. 4a, the cooling liquid flow path is as follows: water pump 23—reversing valve 24 (ports a and b communicating with each other)-high-voltage system cooling branch 22—cooling liquid inlet of the heat exchanger 21—cooling liquid outlet of the heat exchanger 21—water pump 23. In this operating mode, the cooling liquid may absorb heat of devices in the high-voltage system when flowing through the high-voltage system, and then return to the heat exchanger 21 to exchange heat with the refrigerant flowing through the heat exchanger 21, so as to raise the temperature of the refrigerant.

When the second thermal management system 20 is in the high-voltage system waste heat+external environment energy mode (the mode of absorbing external environment energy and releasing energy to the external environment), referring to FIG. 4b, the cooling liquid flow path is as follows: water pump 23—reversing valve 24 (ports a and c communicating with each other)-heat sink 25—high-voltage system cooling branch 22—cooling liquid inlet of the heat exchanger 21—cooling liquid outlet of the heat exchanger 21—water pump 23.

In the mode of absorbing external environment energy, the cooling liquid flowing out from the water pump 23 absorbs heat in the environment when flowing through the heat sink 25, then continues to absorb heat of devices in the high-voltage system when flowing through the high-voltage system, and then returns to the heat exchanger 21 to exchange heat with the refrigerant flowing through the heat exchanger 21, so as to raise the temperature of the refrigerant. By adding a heat source in the second thermal management system 20, the heat absorbed from the external environment and the heat absorbed from the high-voltage system are superimposed, and more heat is absorbed, to cause the refrigerant to absorb more heat from the cooling liquid, thereby increasing the energy utilization of the vehicle.

In the mode of releasing heat to the external environment, the cooling liquid flowing out from the water pump 23 releases heat to the external environment when flowing through the heat sink 25, then continues to exchange heat with the high-voltage system when flowing through the high-voltage system, and then returns to the heat exchanger 21 to exchange heat with the refrigerant flowing through the heat exchanger 21, so as to lower the temperature of the refrigerant.

In an implementation, the mode of the second thermal management system 20 is selected according to a specific heating requirement of the battery pack 12. When the waste heat of the high-voltage system is enough to heat the battery pack 12 to a specified temperature, the second thermal management system 20 is in the high-voltage system waste heat utilization mode. When the waste heat of the high-voltage system is not enough to heat the battery pack 12 to a specified temperature, the second thermal management system 20 is in a high-voltage system waste heat+external environment energy mode. It may be understood that in some implementations, the mode of the second thermal management system 20 may also be set according to other requirements.

Figure 4A:
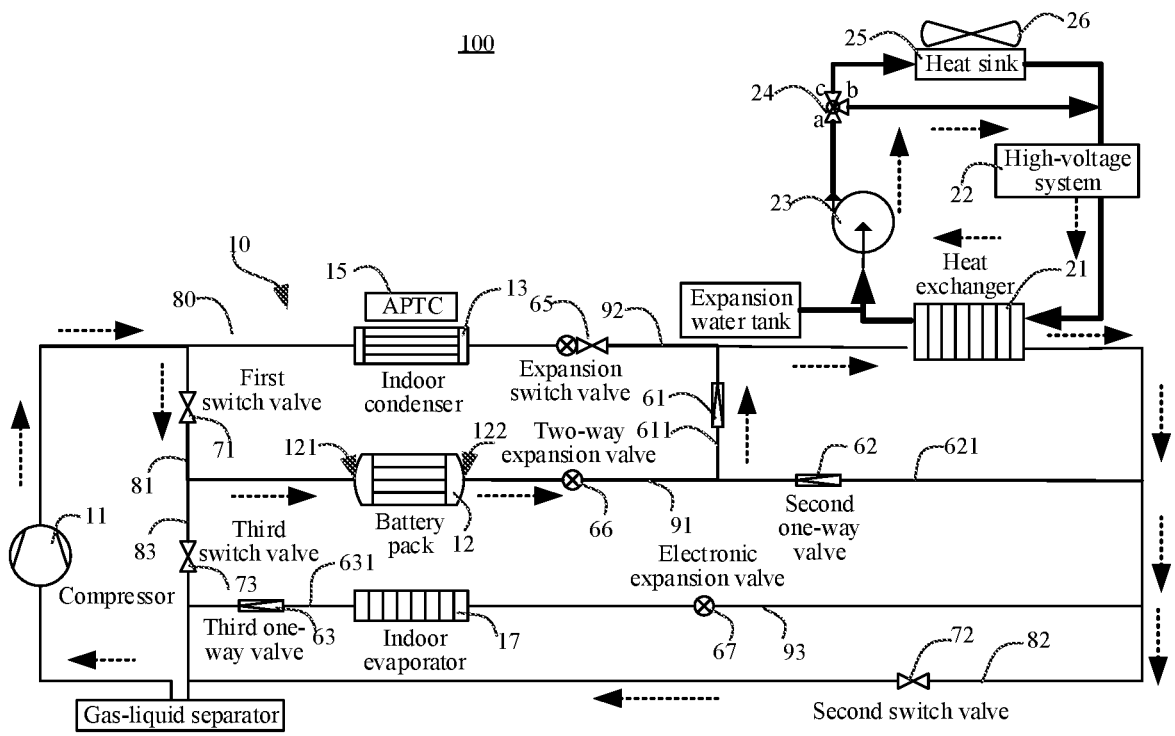
FIG. 4a is a schematic diagram of a circulation circuit of a vehicle thermal management system in a battery pack heating-high-voltage system waste heat utilization mode.
Figure 4B:
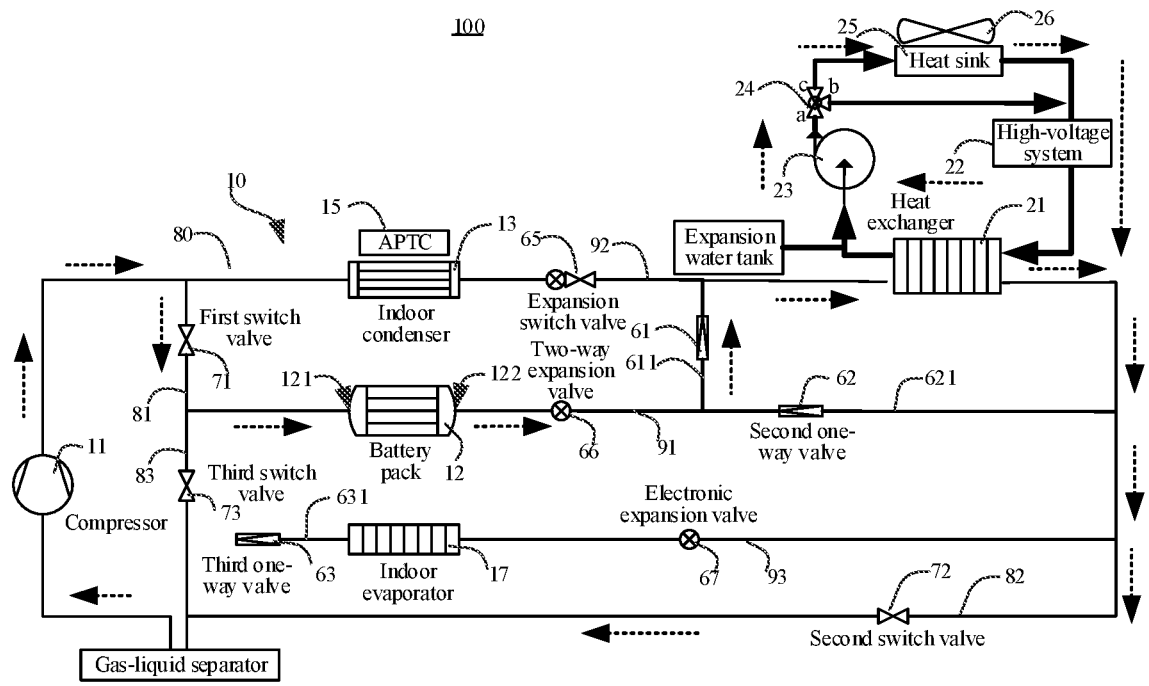
FIG. 4b is a schematic diagram of a circulation circuit of a vehicle thermal management system in a mode of battery pack heating-high-voltage system waste heat+external environment energy according to an implementation of the present disclosure.

Through the above technical solutions, when the ambient temperature is relatively low and it is necessary to heat the battery pack 12, refer to FIG. 4a and FIG. 4b, the first thermal management system 10 is in a heating mode of the battery pack 12, and the second thermal management system 20 is in the high-voltage system waste heat utilization mode or the high-voltage system waste heat+external environment energy mode in this case. In the heating mode of the battery pack 12, a circulation circuit of the refrigerant is as follows: compressor 11—first port 121 of direct-cooling device of battery pack 12—second port 122 of direct-cooling device of battery pack 12—first throttle branch 91—heat exchanger 21—gas-liquid separator-compressor 11. The specific process is that the electric compressor 11 starts to operate to compress the refrigerant, a high-temperature and high-pressure gaseous refrigerant flows out from the compressor 11, and the high-temperature and high-pressure gaseous refrigerant flows into the direct-cooling device inside the battery pack 12 and releases a lot of heat for heat exchange with the battery pack 12. A medium-temperature and high-pressure refrigerant after heat exchange becomes a low-temperature and low-pressure liquid after being throttled and depressurized by the first throttle branch 91, and then enters the heat exchanger 21 to absorb heat. The high-temperature and low-pressure refrigerant after heat absorption returns to the compressor 11 through the gas-liquid separator to enter a next cycle.

The high-voltage system cooling branch 22 may exchange heat with the high-voltage system and absorb the heat in the high-voltage system when flowing through the high-voltage system. When flowing through the heat exchanger 21, the cooling liquid with absorbed heat from the high-voltage system may exchange heat with the refrigerant flowing through the heat exchanger 21, thereby transferring the heat absorbed from the high-voltage system to the refrigerant. In this way, the recycled heat may be used to heat the battery pack 12, and the waste heat of the high-voltage system can be effectively used. Therefore, the battery pack 12 may be further heated by using the heat while cooling the devices in the high-voltage system, which improves the energy utilization. It is not necessary to heat the battery pack 12 with an air conditioner. Therefore, the heating energy efficiency of the air conditioner system for the passenger compartment can be improved.

In addition, since the direct-cooling device is arranged on the battery pack 12, the heat exchange between the refrigerant and the battery pack 12 is completed through the direct-cooling device. Therefore, it is unnecessary to arrange, on the battery pack 12, an additional heat exchanger and a pipeline communicating with the additional heat exchanger for cooling the battery pack 12, which simplifies the pipeline arrangement for heating and cooling the battery pack 12 and reduces the cost. The refrigerant is directly used to exchange heat with the battery pack 12, which has high heat exchange efficiency and is not affected by the external environment. No matter in a high-temperature or low-temperature environment, the battery pack 12 can operate within a suitable temperature range, which improves the charging and discharging efficiency of the battery pack 12, improves the endurance, extends the service life of the battery pack 12, and ensures the safety of the battery pack 12.

In order to improve the heating and cooling efficiency of the battery pack 12, in an implementation of the present disclosure, the battery pack 12 includes a battery module and the direct-cooling device. The direct-cooling device includes multiple cooling pipelines configured to guide a refrigerant. The multiple cooling pipelines are laid on a surface of the battery module. The direct-cooling device is configured to transfer heat from the battery module to the refrigerant when cooling the battery, or transfer heat from the refrigerant to the battery module when heating the battery. The direct-cooling device is not limited to only cooling the battery pack 12. When a temperature of the refrigerant in the direct-cooling device is higher than a temperature of the battery pack 12, the direct-cooling device heats the battery pack 12 at this time. When a temperature of the refrigerant in the direct-cooling device is lower than the temperature of the battery pack 12, the direct-cooling device cools the battery pack 12 at this time.

It should be noted herein that in the present disclosure, the battery pack 12 may include a battery pack box and multiple battery modules arranged in the battery pack box, and the direct-cooling device is arranged in the battery pack box and closely attached to the multiple battery modules. In this way, the refrigerant flows through the direct-cooling device, and the direct-cooling device is closely attached to the multiple battery modules, to cause the refrigerant to directly exchange heat with the battery modules, thereby improving the heat exchange efficiency.

In an implementation of the present disclosure, the heat exchanger 21 may be a plate heat exchanger 21, and the plate heat exchanger 21 is a high efficiency heat exchanger 21 formed by stacking a series of metal sheets having a certain corrugated shape. Thin rectangular channels are formed among the various plates, and heat exchange is performed through the plates. The plate heat exchanger 21 has the characteristics such as high heat exchange efficiency, small heat loss, a compact and light structure, a small floor space, wide application, long service life, and the like. Under the same pressure loss, the heat transfer coefficient of the plate heat exchanger is 3-5 times higher than that of a tubular heat exchanger 21, the occupied area is one third of the tubular heat exchanger 21, and the heat recovery rate may be as high as over 90%. Therefore, the plate heat exchanger does not occupy excessively large space on the vehicle.

In order to cool the battery pack 12 when the temperature of the battery pack 12 is excessively high, in an implementation of the present disclosure, as shown in FIG. 1, the first thermal management system further includes a bi-directional expansion assembly 50. The outlet of the compressor 11 may communicate with the refrigerant inlet of the heat exchanger 21 through the first branch 80, and/or with the first port 121 of the direct-cooling device of the battery pack 12 through a first flow branch 81. That is to say, the outlet of the compressor 11 may communicate with at least one of the refrigerant inlet of the heat exchanger 21 and the first port 121 of the direct-cooling device of the battery pack 12. The second port 122 of the direct-cooling device of the battery pack 12 is in unidirectional communication with a refrigerant inlet of the heat exchanger 21 through the bi-directional expansion assembly 50, and a refrigerant outlet of the heat exchanger 21 communicates with an inlet of the compressor 11 through a second flow branch 82. The first port 121 of the direct-cooling device of the battery pack 12 further communicates with the inlet of the compressor 11 through a third flow branch 83. The second port 122 of the direct-cooling device of the battery pack 12 is in unidirectional communication with the refrigerant inlet of the heat exchanger 21, which can prevent the refrigerant flowing out from the outlet of the compressor 11 from directly flowing to the battery pack 12 when cooling the battery pack 12.

In an implementation of the present disclosure, a third switch valve 73 may be arranged on the third flow branch 83, and the third switch valve 73 is configured to be open only when the flow direction of the refrigerant in the battery pack 12 is from the second port 122 to the first port 121 of the direct-cooling device of the battery pack 12.

Figure 6:
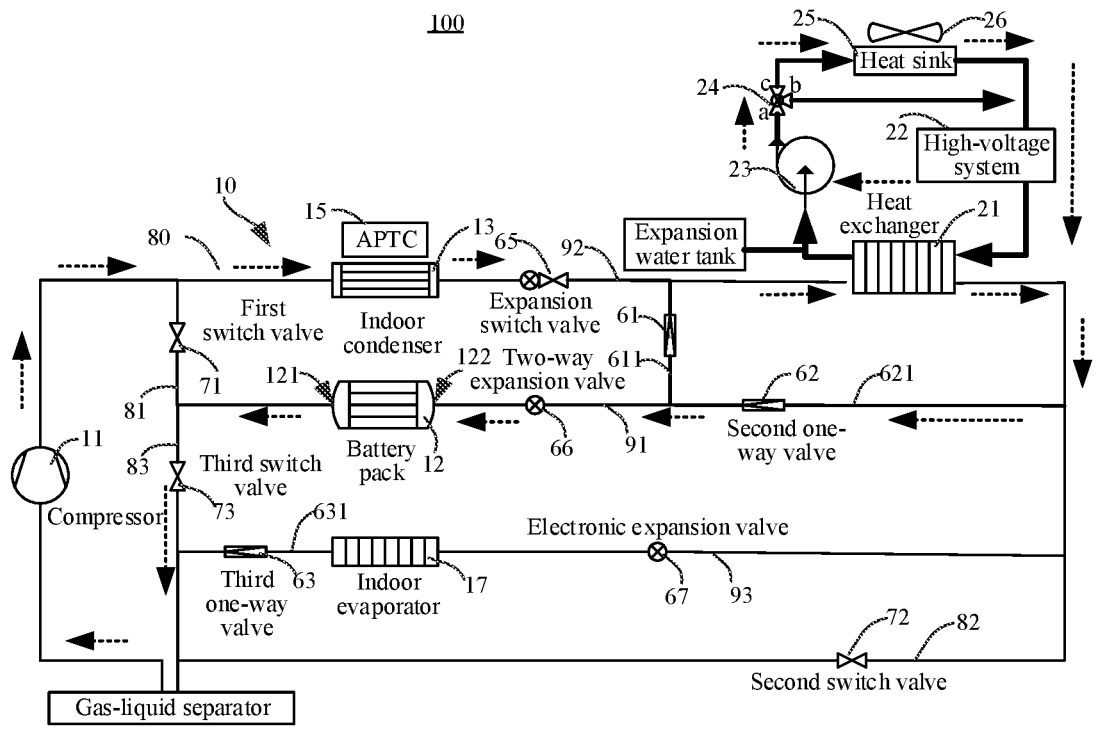
FIG. 6 is a schematic diagram of a circulation circuit of a vehicle thermal management system in a battery pack cooling mode according to an implementation of the present disclosure.

Through the above technical solutions, when the temperature of the battery pack 12 is excessively high and it is necessary to cool the battery pack 12, refer to FIG. 6, the first thermal management system 10 is in a battery pack 12 cooling mode, and the second thermal management system 20 is in the mode of high-voltage system waste heat+ releasing energy to the external environment. In this case, the heat sink 25 functions to release a large amount of heat to the external environment. The circulation circuit of the refrigerant is as follows: compressor 11—first branch 80—heat exchanger 21—bi-directional expansion assembly 50—second port 122 of direct-cooling device of battery pack 12—first port 121 of direct-cooling device of battery pack 12—gas-liquid separator-compressor 11. When the temperature of the battery pack 12 is relatively high, the electric compressor 11 starts to operate. The high-temperature and high-pressure gaseous refrigerant from the compressor 11 flows into the heat exchanger 21 to exchange heat with the cooling liquid in the heat exchanger 21, and releases a lot of heat. The low-temperature refrigerant after the heat exchange enters the battery pack 12 after throttling and depressurization through the bi-directional expansion assembly 50 and absorbs the heat of the battery pack 12, and the high-temperature refrigerant after the heat absorption returns to the compressor 11 through the gas-liquid separator to enter the next cycle. The bi-directional expansion assembly in the circuit functions to control the flow direction of the refrigerant, especially prevent the refrigerant flowing out from the second port 122 of the battery pack 12 from directly returning to the compressor 11 in the heating mode of the battery pack 12.

In addition, by properly arranging the bi-directional expansion assembly 50, the same branch can be used for heating and cooling of the battery pack 12. Only the flow direction of the refrigerant in the pipeline is changed, and no additional pipeline is required, which further simplifies the pipeline arrangement.

In an implementation, the third switch valve 73 and the following switch valves such as the first switch valve 71 and the second switch valve 72 may be solenoid valves. It may be understood that in some implementations, the switch valves such as the first switch valve 71, the second switch valve 72, and the third switch valve 73 may be any valve that can realize the switch function, which is not limited in the present disclosure. For example, the switch valve may be the reversing valve 24, or the like. Other switch valves (such as the first switch valve 71 and the second switch valve 72) appearing in the following of the present disclosure may be solenoid valves or other valves that can realize the switch function, which is not limited in the present disclosure, and the details are not described below.

In the present disclosure, the refrigerant flowing out from the compressor 11 may flow through the battery pack 12 or the first branch 80. In order to control the flow direction of the refrigerant, in an implementation of the present disclosure, as shown in FIG. 1, an expansion switch valve 65 is provided on the first branch 80, and the first switch valve 71 is provided on the first flow branch 81.

Through the joint control of the expansion switch valve 65 and the first switch valve 71, the flow direction of the refrigerant flowing out from the compressor 11 can be specifically controlled as follows. When the first switch valve 71 is opened and the expansion switch valve 65 is closed, the refrigerant from the compressor 11 only flows to the battery pack 12 and can only heat the battery pack 12. When the first switch valve 71 is closed and the expansion switch valve 65 is opened, the refrigerant from the compressor 11 only flows to the first branch 80 (provided with the in-vehicle condenser 13) and can only heat the passenger compartment. When the first switch valve 71 is opened and the expansion switch valve 65 is opened, the refrigerant from the compressor 11 flows to the battery pack 12 and the in-vehicle condenser 13 respectively, thereby simultaneously heating the passenger compartment and the battery pack 12. Therefore, through the joint control of the expansion switch valve 65 and the first switch valve 71, the outlet of the compressor 11 may communicate with the first port 121 of the direct-cooling device of the battery pack 12 and/or in communication with the first branch 80.

In the present disclosure, the specific structure of the bi-directional expansion assembly 50 is not limited, and may be arranged as required. In an implementation, as shown in FIG. 1, the bi-directional expansion assembly 50 includes a bi-directional expansion valve 66, a first check valve 61, and a second check valve 62. The bi-directional expansion valve 66 communicates with the second port 122 of the direct-cooling device, and the first check valve 61 communicates with the bi-directional expansion valve 66 to form a first one-way throttle branch for flowing from the second port 122 of the direct-cooling device to the refrigerant inlet of the heat exchanger 21. The second check valve 62 communicates with the bi-directional expansion valve 66 to form a second one-way throttle branch for flowing from the refrigerant outlet of the heat exchanger 21 to the second port 122 of the direct-cooling device. The first one-way throttle branch includes the first throttle branch 91 and a first one-way branch 611, and the second one-way throttle branch includes a second one-way branch 621 and the first throttle branch 91.

Through the bi-directional expansion assembly 50, when the battery pack 12 is heated, the refrigerant flows from the second port 122 of the direct-cooling device of the battery pack 12 to the refrigerant inlet of the heat exchanger 21 along a first channel, and when the battery pack 12 is cooled, the refrigerant flows from the refrigerant outlet of the heat exchanger 21 to the second port 122 of the direct-cooling device of the battery pack 12 along a second channel. Therefore, through the reasonable arrangement of the bi-directional expansion assembly 50, the same branch can be used for heating and cooling of the battery pack 12, so that no additional pipeline is necessary and the pipeline arrangement is simplified.

In the embodiment shown in FIG. 1, the first check valve 61 forms the first one-way branch 611, the second check valve forms the second one-way branch 621, and the pipeline where the bi-directional expansion valve 66 is located forms the first throttle branch 91. The second one-way branch 621 only allows the refrigerant flowing from the refrigerant outlet of the heat exchanger 21 to flow into the second port 122 of the direct-cooling device of the battery pack 12, and the first one-way branch 611 only allows the refrigerant flowing from the second port 122 of the direct-cooling device of the battery pack 12 to flow into the refrigerant inlet of the heat exchanger 21. The one-way communication manner can be realized in multiple manners. In an implementation of the present disclosure, the unidirectional communication manner is realized through a check valve. In some implementations, a controllable switch valve may be arranged on the one-way branch, and the switch valve is open only when the flow direction of the refrigerant is correct. The third one-way branch 631 in the following may also be realized in at least two of the above manners, that is, by arranging a check valve or arranging a controllable switch valve.

Figure 3:
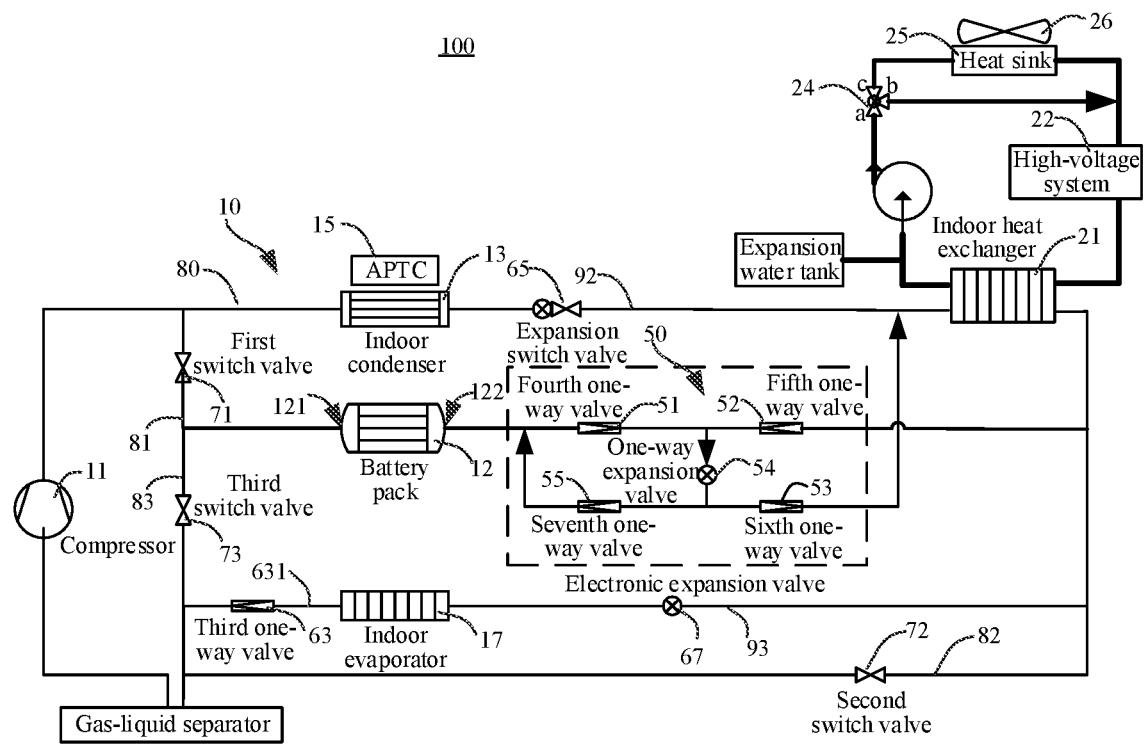
FIG. 3 is a schematic diagram of a circulation circuit of a vehicle thermal management system according to another implementation of the present disclosure.

As an implementation of the bi-directional expansion assembly 50, as shown in FIG. 3, the bi-directional expansion assembly 50 includes a fourth check valve 51, a fifth check valve 52, a sixth check valve 53, a seventh check valve 55, and a one-way expansion valve 54. The fourth check valve 51 communicates with the sixth check valve 53 to form a first channel for flowing from the second port 122 of the direct-cooling device to the refrigerant inlet of the heat exchanger 21. The fifth check valve 52 communicates with the seventh check valve 55 to form a second channel for flowing from the refrigerant outlet of the heat exchanger 21 to the second port 122 of the direct-cooling device. An outlet of the fourth check valve 51 and an outlet of the fifth check valve 52 both communicates with an inlet of the one-way expansion valve 54, and an inlet of the sixth check valve 53 and an inlet of the seventh check valve 55 both communicates with an outlet of the one-way expansion valve 54. In this way, the first channel forms the first one-way throttle branch, and the second channel forms the second one-way throttle branch. The first one-way throttle branch includes the fourth check valve 51, the one-way expansion valve 54, and the sixth check valve 53 which are opened in sequence, and the second one-way throttle branch includes the fifth check valve 52, the one-way expansion valve 54, and the seventh check valve 55 which are opened in sequence.

In order to heat the passenger compartment of the vehicle, in an implementation of the present disclosure, as shown in FIG. 1, the first thermal management system 10 further includes an in-vehicle condenser 13. The in-vehicle condenser 13 is arranged on the first branch 80. An inlet of the in-vehicle condenser 13 communicates with the outlet of the compressor 11. A second throttle branch 92 is arranged between an outlet of the in-vehicle condenser 13 and the refrigerant inlet of the heat exchanger 21.

Figure 5A:
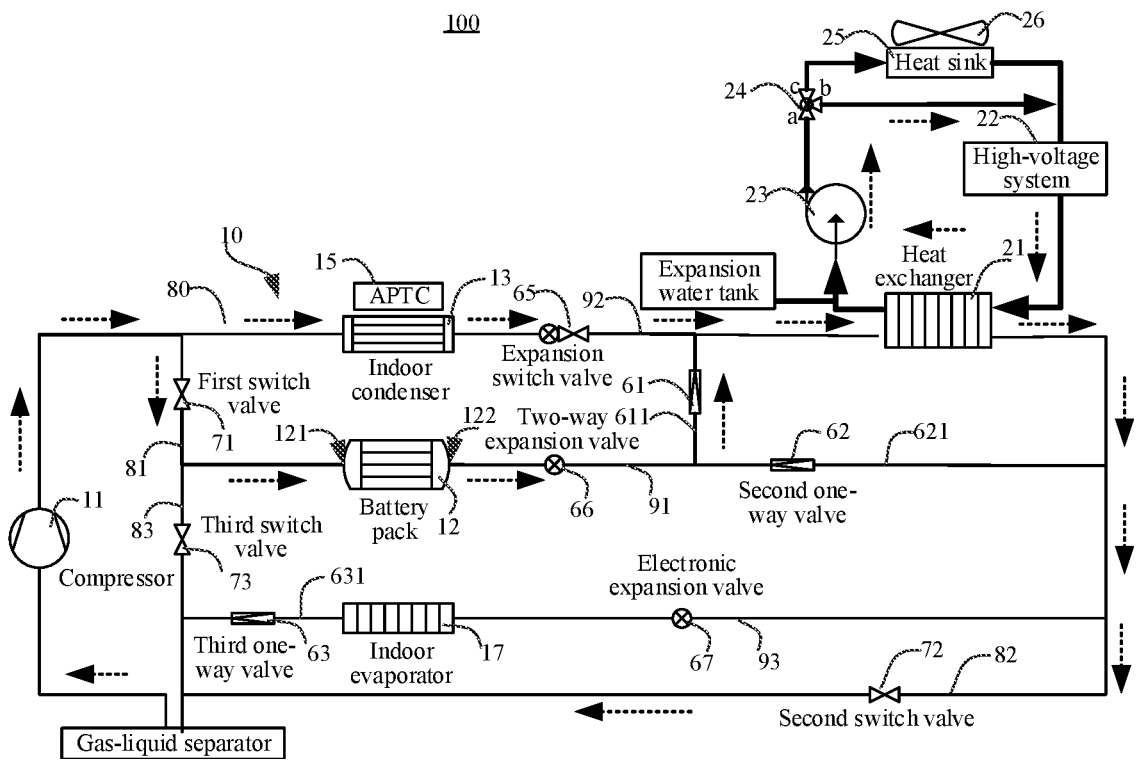
FIG. 5a is a schematic diagram of a circulation circuit of a vehicle thermal management system in a mode of battery pack heating and passenger compartment heating-high-voltage system waste heat utilization according to an implementation of the present disclosure.
Figure 5B:
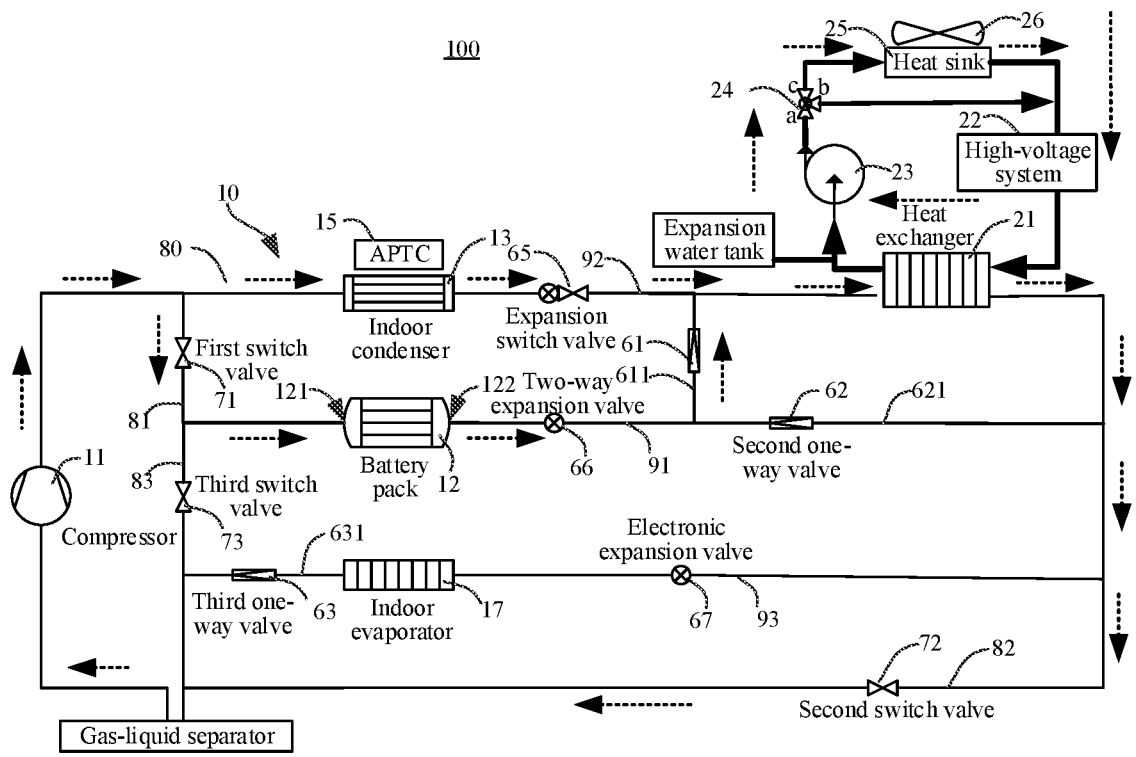
FIG. 5b is a schematic diagram of a circulation circuit of a vehicle thermal management system in a mode of battery pack heating and passenger compartment heating-high-voltage system waste heat+external environment energy according to an implementation of the present disclosure.

By arranging the in-vehicle condenser 13, the vehicle thermal management system 100 can also realize the heating mode of the passenger compartment. In this case, as shown in FIG. 5a and FIG. 5b, the circulation circuit of the refrigerant is as follows: compressor 11—in-vehicle condenser 13—heat exchanger 21—gas-liquid separator-compressor 11.

The vehicle thermal management system 100 can also realize the mode of heating the passenger compartment and heating of the battery pack 12. In this case, as shown in FIG. 5a and FIG. 5b, the circulation circuit of the refrigerant is as follows: compressor 11—in-vehicle condenser 13—heat exchanger 21—gas-liquid separator-compressor 11, and compressor 11—battery pack 12—heat exchanger 21—gas-liquid separator-compressor 11.

During the heating of the passenger compartment, in an implementation, the mode of the second thermal management system 20 is selected according to a specific heating requirement of the passenger compartment and/or the battery pack 12. When waste heat of the high-voltage system is enough to heat the passenger compartment and/or the battery pack 12 to a specified temperature, the second thermal management system 20 is in the high-voltage system waste heat utilization mode. When the waste heat of the high-voltage system is not enough to heat the passenger compartment and/or the battery pack 12 to a specified temperature, the second thermal management system 20 is in a high-voltage system waste heat+external environment energy mode. It may be understood that in some implementations, the mode of the second thermal management system 20 may also be set according to other requirements.

When the passenger compartment does not need to be heated, for example, in the heating and cooling mode of the battery pack 12 described above or the passenger compartment cooling mode described below, in this case, the air is controlled by the damper mechanism not to pass through the in-vehicle condenser 13. Since no wind passes, heat exchange is not performed in the in-vehicle condenser 13, and the in-vehicle condenser 13 is only used as a flow channel.

In an implementation of the present disclosure, as shown in FIG. 1, the first thermal management system 10 further includes an expansion switch valve 65. The expansion switch valve 65 is provided with a flow channel and a throttle flow channel therein. When the expansion switch valve 65 is used as a switch valve, the flow channel inside the expansion switch valve is unobstructed. When the expansion switch valve 65 is used as an expansion valve, the throttle flow channel inside the expansion switch valve is unobstructed.

The expansion switch valve 65 is arranged on the first branch 80. An inlet of the expansion switch valve 65 communicates with the outlet of the in-vehicle condenser 13, and an outlet of the expansion switch valve 65 communicates with the refrigerant inlet of the heat exchanger 21.

In the present disclosure, the expansion switch valve 65 is a valve with the functions of both the expansion valve and the switch valve, which may be regarded as the integration of the switch valve and the expansion valve. An example implementation of the expansion switch valve 65 is to be provided below.

When the passenger compartment is heated by the heat exchanger 21, the expansion switch valve 65 is used as the expansion valve, and the high-temperature and high-pressure refrigerant flowing out from the compressor 11 is throttled and depressurized through the throttle flow channel inside the expansion switch valve 65 and then provided to the heat exchanger 21. In the cooling mode of the battery pack 12, the expansion switch valve 65 is used as the switch valve, and the refrigerant flowing out from the compressor 11 is provided to the heat exchanger 21 through the flow channel inside the expansion switch valve 65 and then flows to the battery pack 12. When the refrigerant flowing out from the compressor 11 needs to flow through the first branch 80, the expansion switch valve 65 is opened. When the refrigerant flowing out from the compressor 11 only flows directly to the battery pack 12 (for example, when only the battery pack 12 is heated), the expansion switch valve 65 is closed, thereby closing the first branch 80, so that the refrigerant flowing out from the compressor 11 all flows into the branch where the battery pack 12 is located.

Figure 9:
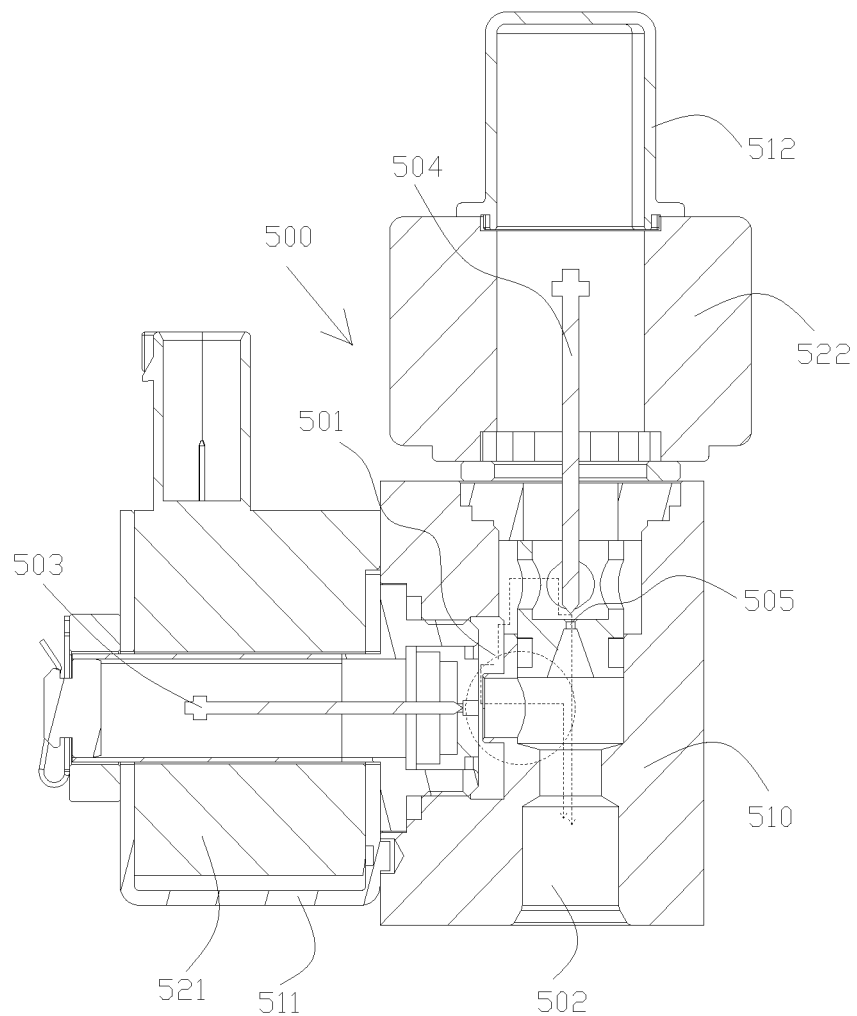
FIG. 9 is a schematic sectional view of an expansion switch valve of a vehicle thermal management system according to an implementation of the present disclosure.

As shown in FIG. 9, the expansion switch valve 65 mentioned above may include a valve body 500. An inlet, an outlet, and an internal flow channel communicating the inlet with the outlet are formed on the valve body, and a first valve core 503 and a second valve core 504 are mounted on the internal flow channel. The first valve core 503 directly communicates the inlet 501 with the outlet 502 or cuts off the communication, and the second valve core 504 communicates the inlet 501 with the outlet 502 or cuts off the communication through a throttle port 505.

The "direct communication" realized by the first valve core 503 means that the coolant entering from the inlet 501 of the valve body 500 may pass over the first valve core 503 and flow directly to the outlet 502 of the valve body 500 through the internal flow channel without being affected. The "cutting communication" realized by the first valve core 503 means that the coolant entering from the inlet 501 of the valve body 500 cannot pass over the first valve core 503 and cannot flow to the outlet 502 of the valve body 500 through the internal flow channel. The "communication through the throttle port" realized by the second valve core 504 means that the coolant entering from the inlet 501 of the valve body 500 may pass over the second valve core 504 and flow to the outlet 502 of the valve body 500 through throttling of the throttle port 505. The "cutting communication" realized by the second valve core 504 means that the coolant entering from the inlet 501 of the valve body 500 cannot pass over the second valve core 504 and cannot flow to the outlet 502 of the valve body 500 through the throttle port 505.

In this way, by controlling the first valve core 503 and the second valve core 504, the expansion switch valve 65 of the present disclosure can cause the coolant entering from the inlet 501 to realize at least three states, that is, 1) a cut-off state; 2) a direct communication state of the first valve core 503 that is passed over; and 3) a throttle communication manner of the second valve core 504 that is passed over.

The high-temperature and high-pressure liquid refrigerant may become a low-temperature and low-pressure vaporous hydraulic refrigerant after being throttled by the throttle 505, which can create conditions for the evaporation of the refrigerant. That is to say, a cross-sectional area of the throttle port 505 is less than a cross-sectional area of the outlet 502, and an opening degree of the throttle 505 can be adjusted by controlling the second valve core 504 to control the flow through the throttle port 505, thereby preventing insufficient refrigeration caused by insufficient refrigerants, and preventing the compressor from liquid hammer caused by excessive refrigerants. That is to say, the coupling between the second valve core 504 and the valve body 500 may cause the expansion switch valve 65 to function as the expansion valve.

In this way, the first valve core 503 and the second valve core 504 are mounted on the internal flow channel of the same valve body 500, to realize the open/closing control and/or throttling control function of the inlet 501 and the outlet 502, and the structure is simple and easy to produce and mount. In addition, when the expansion switch valve 65 provided in the present disclosure is applied to the thermal management system, since the expansion switch valve 65 is the integration of the switch valve and the expansion valve, compared with the arrangement of at least two parallel branches (a flow branch and a throttle branch) in the related art, only one branch flowing through the expansion switch valve 65 needs to be arranged. In this way, the pipeline connection is simplified, which is more conducive to the oil return of the thermal management system, which can reduce the refrigerant charge of the whole thermal management system and reduce the cost.

As an exemplary internal mounting structure of the valve body 500, as shown in FIG. 9, the valve body 500 includes a valve seat forming an internal flow channel, and a first valve housing 511 and a second valve housing 512 mounted on the valve seat. A first electromagnetic driving portion 521 configured to drive the first valve core 503 is mounted in the first valve housing 511, and a second electromagnetic driving portion 522 configured to drive the second valve core 504 is mounted in the second valve housing 512. The first valve core 503 extends from the first valve housing 511 to the internal flow channel in the valve seat 510, and the second valve core 504 extends from the second valve housing 512 to the internal flow channel in the valve seat 510.

A position of the first valve core 503 can be conveniently controlled by controlling the on-off of the first electromagnetic driving portion 521 (such as an electromagnetic coil), so as to control the inlet 501 and the outlet 502 to be directly communicated or the communication between the inlet and the outlet to be cut off. A position of the second valve core 504 can be conveniently controlled by controlling the on-off of the second electromagnetic driving portion 522 (such as an electromagnetic coil), so as to control the inlet 501 and the outlet 502 to be communicated with the throttle port 505 or not. In other words, an electronic expansion valve and a solenoid valve sharing the inlet 501 and the outlet 502 are mounted in the valve body 500 in parallel. Therefore, the automatic control of closing/opening and/or throttling of the expansion switch valve can be realized, and the pipeline direction can be simplified.

As an implementation of the expansion switch valve 65, an expansion valve may be arranged on the first branch 80, and a switch valve may be arranged in parallel with the expansion valve. When the refrigerant does not need to be throttled, the expansion valve is closed and the switch valve is opened, to cause the refrigerant to directly flow through the branch where the switch valve is located. When the refrigerant needs to be throttled, the expansion valve is opened and the switch valve is closed, to cause the refrigerant to flow through the first branch 80 where the expansion valve is located.

In order to realize the refrigeration of the passenger compartment of the vehicle, in an implementation of the present disclosure, as shown in FIG. 1, the first thermal management system 10 further includes an in-vehicle evaporator 17. The refrigerant outlet of the heat exchanger 21 communicates with an inlet of the in-vehicle evaporator 17 through a third throttle branch 93, and an outlet of the in-vehicle evaporator 17 communicates with the inlet of the compressor 11 through a third one-way branch 631. A third check valve 63 is arranged on the third one-way branch 631. The third check valve 63 only allows the refrigerant flowing out from the outlet of the in-vehicle evaporator 17 to return to the compressor 11.

Figure 7:
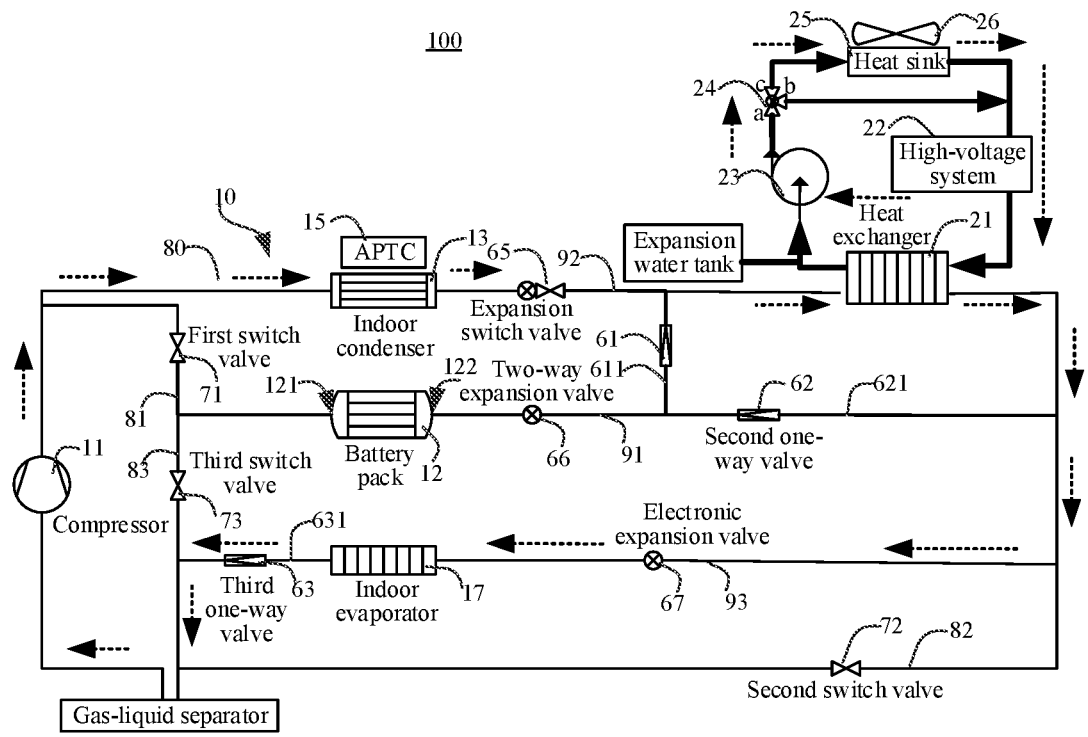
FIG. 7 is a schematic diagram of a circulation circuit of a vehicle thermal management system in a passenger compartment cooling mode according to an implementation of the present disclosure.
Figure 8:
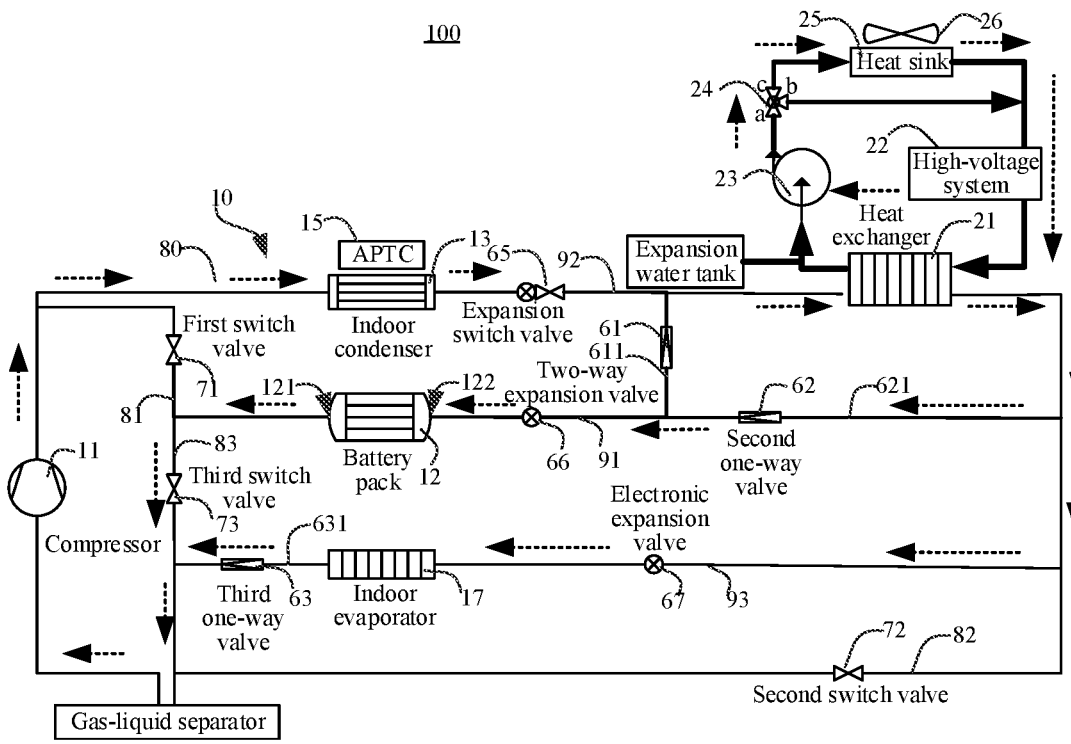
FIG. 8 is a schematic diagram of a circulation circuit of a vehicle thermal management system in a mode of battery pack cooling and passenger compartment cooling according to an implementation of the present disclosure.

The vehicle thermal management system 100 may further realize various passenger compartment cooling modes by arranging the in-vehicle evaporator 17. In this case, as shown in FIG. 7 and FIG. 8, the second thermal management system 20 is in the mode of high-voltage system waste heat+releasing energy to the external environment. In this case, the heat sink 25 functions to release a large amount of heat to the external environment.

In this case, the air is controlled by the damper mechanism not to pass through the in-vehicle condenser 13, and the in-vehicle condenser 13 is only used as a flow channel. The high-temperature and high-pressure refrigerant flowing out from the outlet of the in-vehicle condenser 13 enters the heat exchanger 21 for heat exchange through the flow branch of the expansion switch valve 65. The low-temperature and high-pressure refrigerant is throttled and depressurized by the electronic expansion valve 67 on the third throttle branch 93 to become the low-temperature and low-pressure refrigerant, and enters the in-vehicle evaporator 17 to evaporate and absorb heat, thereby reducing the temperature of the passenger compartment of the vehicle. In the passenger compartment cooling mode, the first switch valve 71 is closed and the second switch valve 72 is closed. The circulation circuit of the refrigerant is as follows: compressor 11—in-vehicle condenser 13 (without heat exchange)-flow channel of expansion switch valve 65—heat exchanger 21—third throttle branch 93 (electronic expansion valve 67)-in-vehicle evaporator 17—third one-way branch 631—gas-liquid separator-compressor 11.

In the present disclosure, the refrigerant flowing out from the heat exchanger 21 can flow through the battery pack 12 or back to the compressor 11 or the in-vehicle evaporator 17. In order to control the flow direction of the refrigerant, in an implementation of the present disclosure, as shown in FIG. 1, the second switch valve 72 is arranged on the second flow branch 82, and the electronic expansion valve 67 is arranged on the third throttle branch 93.

By arranging the bi-directional expansion assembly, the electronic expansion valve 67 on the third throttle branch 93, and the second switch valve 72 on the second flow branch 82, the specific flow direction of the refrigerant flowing out from the outlet of the heat exchanger 21 can be controlled through the joint control of the bi-directional expansion valve 66, the electronic expansion valve 67, and the second switch valve 72, so that the refrigerant flowing out from the outlet of the heat exchanger 21 can flow to at least one of the battery pack 12, the in-vehicle evaporator 17, or the compressor 11.

In order to further improve the heating capacity of the passenger compartment, as shown in FIG. 1, the first thermal management system 10 further includes a heater 15. The heater 15 is configured to heat air passing through the in-vehicle condenser 13 to supply heat to a vehicle. The heater 15 may be an air heater 15 (APTC). When the heat released to the flowing refrigerant by the in-vehicle condenser 13 is not enough to heat the air to the required temperature, the heater 15 may be turned on, the air is further heated by the heater 15, so as to meet the heating requirements of the passenger compartment.

In order to accelerate the heat dissipation of the heat sink 25 and improve the heat dissipation effect, in an implementation of the present disclosure, as shown in FIG. 1, the second thermal management system 20 further includes a fan 26. The fan 26 is disposed opposite to the heat sink 25 to accelerate the heat dissipation of the heat sink 25. When the second thermal management system 20 is in the mode of high-voltage system waste heat+external environment energy and needs to dissipate heat to the external environment, the fan 26 is turned on to accelerate the heat dissipation.

Figure 10:
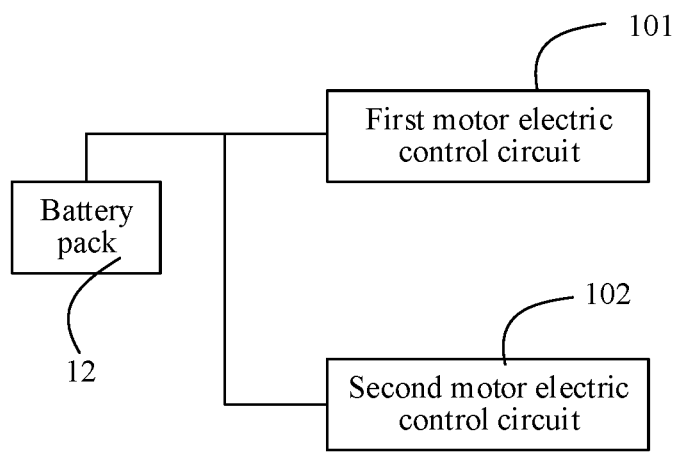
FIG. 10 is a control schematic diagram of a self-heating device of a battery pack of a vehicle thermal management system according to an implementation of the present disclosure.

In order to improve the heating effect of the battery pack 12, in an implementation of the present disclosure, as shown in FIG. 10, the battery pack 12 includes a self-heating device (not shown) configured to increase heat generated by the battery module. The self-heating device includes a controller, a first motor electric control circuit 101, and a second motor electric control circuit 102. The first motor electric control circuit 101 and the second motor electric control circuit 102 are respectively electrically connected with the battery pack 12, and the controller is respectively electrically connected with the first motor electric control circuit 101 and the second motor electric control circuit 102. When the controller is configured to operate in a first control mode, the controller is configured to control the first motor electric control circuit 101 to charge and discharge the battery pack 12 to multiple times, so as to heat the battery pack 12, and control the second motor electric control circuit 102 to output torque.

The self-heating device of this embodiment includes the first motor electric control circuit 101, a second motor electric control circuit 102, a first energy storage module, and a controller. When the controller is configured to operate in the first control mode, the controller controls a first motor inverter in the first motor electric control circuit 101 to cause the battery pack 12, the first motor inverter, and a first motor winding to form a first battery pack heating circuit. An internal resistance of the battery pack 12 is heated by the first battery pack heating circuit, and a second motor inverter in the second motor electric control circuit 102 is controlled to cause the second motor electric control circuit 102 to output power, thereby realizing the coordination of the heating of the battery pack 12 and the driving of the motor. In addition, since the first motor electric control circuit 101 is used for heating and the second motor electric control circuit 102 is used for driving, an excessive loss of the motor winding and the motor inverter in the motor driving circuit is avoided, and the service life of a device in a circuit is extended.

The first battery pack heating circuit is realized through a battery oscillation heating circuit module. The battery oscillation heating circuit can realize high-frequency alternating charging and discharging of the battery pack, and the circuit further includes multiple energy storage elements and switching elements. When the temperature of the battery pack reaches a heating start threshold, the battery pack is alternately charged and discharged with the energy storage elements, and the self-heating of the battery pack is realized by using the characteristics of the high low-temperature resistance of the battery pack itself. The energy storage elements include a capacitor, an inductor, and the like. The alternating charging and discharging frequency between the battery pack and the energy storage elements is realized by the switching elements.

As an implementation of heating the battery pack 12, the battery pack 12 may include an electric heating film (not shown) configured to increase the heat of the battery module, and the electric heating film is overlaid on the battery module for providing heat for the battery module. The electric heating film, for example, may be a translucent polyester film that can generate heat after being energized, and is made of conductive special ink and metal current-carrying strips machined and hot-pressed between insulating polyester films. During the operation, the electric heating film is used as a heating element, and transfers heat into the space by radiation, for the heated object to obtain heat, thereby raising the temperature. The electric heating film has a high conversion efficiency since it is a purely resistive circuit. Except a loss of a small fraction, a majority of the electric energy is converted into heat energy to heat the battery pack 12.

By arranging the self-heating device on the battery pack 12 and superposing the heat exchange device having the refrigerant flowing therein with the self-heating device, the heating effect of the battery pack 12 can be significantly improved, and the battery heating rate is increased. In addition, since a lot of heat is generated in the high-voltage system when the battery pack 12 is heated by using the self-heating device, the energy utilization rate can be improved by using the waste heat of the high-voltage system.

The present disclosure further provides an electric vehicle, including any of the above provided vehicle thermal management system 100. The electric vehicle may include a pure electric vehicle, a hybrid vehicle, a fuel cell vehicle, and the like.

Some implementations of the present disclosure are described in detail above with reference to the accompanying drawings. However, the present disclosure is not limited to the specific details in the foregoing implementations. Multiple simple variations may be made to the technical solutions of the present disclosure within the scope of the technical concept of the present disclosure, and these simple variations shall fall within the protection scope of the present disclosure.

In addition, it should be noted that the specific technical features described in the foregoing specific implementations may be combined in any proper manner without contradiction. In order to avoid unnecessary repetition, various possible combinations are not described separately in the present disclosure.

In addition, various different implementations of the present disclosure may also be combined without departing from the idea of the present disclosure, and the combinations shall still be regarded as the content disclosed in the present disclosure.

What is claimed is:

1. A system, comprising a first thermal management system and a second thermal management system for a high-voltage system, wherein:
   the second thermal management system comprises a heat sink, a heat exchanger, and a waste heat utilization branch; a high-voltage system cooling branch passes through the high-voltage system, a water pump and the high-voltage system cooling branch are disposed on the waste heat utilization branch; a cooling liquid outlet of the heat exchanger communicates with an inlet of the waste heat utilization branch; and an outlet of the waste heat utilization branch communicates with a cooling liquid inlet of the heat exchanger; and
   the first thermal management system comprises a compressor and a battery pack, a direct-cooling device is disposed on the battery pack; an outlet of the compressor communicates with a first port of the direct-cooling device; a second port of the direct-cooling device communicates with a refrigerant inlet of the heat exchanger; and a refrigerant outlet of the heat exchanger communicates with an inlet of the compressor, wherein the first thermal management system further comprises an in-vehicle condenser disposed on a first branch, an inlet of the in-vehicle condenser communicates with the outlet of the compressor, and a second throttle branch is disposed between an outlet of the in-vehicle condenser and the refrigerant inlet of the heat exchanger.

2. The system according to claim 1, wherein
the first thermal management system further comprises a bi-directional expansion assembly; and the outlet of the compressor communicates with at least one of the refrigerant inlet of the heat exchanger and the first port of the direct-cooling device of the battery pack;
the outlet of the compressor communicates with the refrigerant inlet of the heat exchanger through the first branch, or the outlet of the compressor communicates with the first port of the direct-cooling device through a first flow branch; and
the first port of the direct-cooling device communicates with the inlet of the compressor; the second port of the direct-cooling device communicates with the refrigerant inlet of the heat exchanger through the bi-directional expansion assembly; and the refrigerant outlet of the heat exchanger communicates with the second port of the direct-cooling device through the bi-directional expansion assembly.

3. The system according to claim 2, wherein
the bi-directional expansion assembly comprises a bi-directional expansion valve, a first check valve, and a second check valve;
the bi-directional expansion valve communicates with the second port of the direct-cooling device; the first check valve communicates with the bi-directional expansion valve to form a first one-way throttle branch for flowing from the second port of the direct-cooling device to the refrigerant inlet of the heat exchanger; and
the second check valve communicates with the bi-directional expansion valve to form a second one-way throttle branch for flowing from the refrigerant outlet of the heat exchanger to the second port of the direct-cooling device.

4. The system according to claim 2, wherein
the bi-directional expansion assembly comprises a fourth check valve, a fifth check valve, a sixth check valve, a seventh check valve, and a one-way expansion valve;
the fourth check valve communicates with the sixth check valve to form a first channel for flowing from the second port of the direct-cooling device to the refrigerant inlet of the heat exchanger;
the fifth check valve communicates with the seventh check valve to form a second channel for flowing from the refrigerant outlet of the heat exchanger to the second port of the direct-cooling device;
an outlet of the fourth check valve and an outlet of the fifth check valve both communicate with an inlet of the one-way expansion valve; and
an inlet of the sixth check valve and an inlet of the seventh check valve both communicate with an outlet of the one-way expansion valve, the first channel forms a first one-way throttle branch, and the second channel forms a second one-way throttle branch.

5. The system according to claim 1, wherein
the first thermal management system further comprises an expansion switch valve comprising a flow channel and a throttle flow channel; when the expansion switch valve is configured as a switch valve, the flow channel inside the expansion switch valve is unobstructed;
and when the expansion switch valve is configured as an expansion valve, the throttle flow channel inside the expansion switch valve is unobstructed; and
the expansion switch valve is disposed on the first branch; an inlet of the expansion switch valve communicates with the outlet of the in-vehicle condenser; an outlet of the expansion switch valve communicates with the refrigerant inlet of the heat exchanger.

6. The system according to claim 1, wherein the first thermal management system further comprises an in-vehicle evaporator, the refrigerant outlet of the heat exchanger communicates with an inlet of the in-vehicle evaporator through a third throttle branch, an outlet of the in-vehicle evaporator communicates with the inlet of the compressor through a third one-way branch, and a third check valve is disposed on the third one-way branch.

7. The system according to claim 6, wherein the refrigerant outlet of the heat exchanger communicates with the inlet of the compressor through a second flow branch, a second switch valve is disposed on the second flow branch, and an electronic expansion valve is disposed on the third throttle branch.

8. The system according to claim 1, wherein the battery pack comprises a battery module and the direct-cooling device, the direct-cooling device comprises a plurality of cooling pipelines configured to guide a refrigerant, and the cooling pipelines are disposed on a surface of the battery module.

9. The system according to claim 1, wherein the first thermal management system further comprises a heater configured to heat air passing through the in-vehicle condenser to supply heat to a vehicle.

10. The system according to claim 1, wherein the second thermal management system further comprises a fan disposed opposite to the heat sink to accelerate heat dissipation of the heat sink.

11. An electric vehicle, comprising a vehicle thermal management system comprising a first thermal management system and a second thermal management system for a high-voltage system, wherein:
the second thermal management system comprises a heat sink, a heat exchanger, and a waste heat utilization branch; a high-voltage system cooling branch passes through the high-voltage system, a water pump and the high-voltage system cooling branch are disposed on the waste heat utilization branch; a cooling liquid outlet of the heat exchanger communicates with an inlet of the waste heat utilization branch; and an outlet of the waste heat utilization branch communicates with a cooling liquid inlet of the heat exchanger; and
the first thermal management system comprises a compressor and a battery pack, a direct-cooling device is disposed on the battery pack; an outlet of the compressor communicates with a first port of the direct-cooling device; a second port of the direct-cooling device communicates with a refrigerant inlet of the heat exchanger; and a refrigerant outlet of the heat exchanger communicates with an inlet of the compressor, wherein the first thermal management system further comprises an in-vehicle condenser disposed on a first branch, an inlet of the in-vehicle condenser communicates with the outlet of the compressor, and a second throttle branch is disposed between an outlet of the in-vehicle condenser and the refrigerant inlet of the heat exchanger.

12. The vehicle according to claim 11, wherein
the first thermal management system further comprises a bi-directional expansion assembly; and the outlet of the compressor communicates with at least one of the refrigerant inlet of the heat exchanger and the first port of the direct-cooling device of the battery pack;
the outlet of the compressor communicates with the refrigerant inlet of the heat exchanger through the first branch, or the outlet of the compressor communicates with the first port of the direct-cooling device through a first flow branch; and
the first port of the direct-cooling device communicates with the inlet of the compressor; the second port of the direct-cooling device communicates with the refrigerant inlet of the heat exchanger through the bi-directional expansion assembly; and the refrigerant outlet of the heat exchanger communicates with the second port of the direct-cooling device through the bi-directional expansion assembly.

13. The vehicle according to claim 12, wherein
the bi-directional expansion assembly comprises a bi-directional expansion valve, a first check valve, and a second check valve;
the bi-directional expansion valve communicates with the second port of the direct-cooling device; the first check valve communicates with the bi-directional expansion valve to form a first one-way throttle branch for flowing from the second port of the direct-cooling device to the refrigerant inlet of the heat exchanger; and
the second check valve communicates with the bi-directional expansion valve to form a second one-way throttle branch for flowing from the refrigerant outlet of the heat exchanger to the second port of the direct-cooling device.

14. The vehicle according to claim 12, wherein
the bi-directional expansion assembly comprises a fourth check valve, a fifth check valve, a sixth check valve, a seventh check valve, and a one-way expansion valve;
the fourth check valve communicates with the sixth check valve to form a first channel for flowing from the second port of the direct-cooling device to the refrigerant inlet of the heat exchanger;
the fifth check valve communicates with the seventh check valve to form a second channel for flowing from the refrigerant outlet of the heat exchanger to the second port of the direct-cooling device;
an outlet of the fourth check valve and an outlet of the fifth check valve both communicate with an inlet of the one-way expansion valve; and
an inlet of the sixth check valve and an inlet of the seventh check valve both communicate with an outlet of the one-way expansion valve, the first channel forms a first one-way throttle branch, and the second channel forms a second one-way throttle branch.

15. The vehicle according to claim 11, wherein
the first thermal management system further comprises an expansion switch valve comprising a flow channel and a throttle flow channel; when the expansion switch valve is configured as a switch valve, the flow channel inside the expansion switch valve is unobstructed;
and when the expansion switch valve is configured as an expansion valve, the throttle flow channel inside the expansion switch valve is unobstructed; and
the expansion switch valve is disposed on the first branch; an inlet of the expansion switch valve communicates with the outlet of the in-vehicle condenser; an outlet of the expansion switch valve communicates with the refrigerant inlet of the heat exchanger.

16. The vehicle according to claim 11, wherein the first thermal management system further comprises an in-vehicle evaporator, the refrigerant outlet of the heat exchanger communicates with an inlet of the in-vehicle evaporator through a third throttle branch, an outlet of the in-vehicle evaporator communicates with the inlet of the compressor through a third one-way branch, and a third check valve is disposed on the third one-way branch.

17. The vehicle according to claim 16, wherein the refrigerant outlet of the heat exchanger communicates with the inlet of the compressor through a second flow branch, a second switch valve is disposed on the second flow branch, and an electronic expansion valve is disposed on the third throttle branch.

18. The vehicle according to claim 11, wherein the battery pack comprises a battery module and the direct-cooling device, the direct-cooling device comprises a plurality of cooling pipelines configured to guide a refrigerant, and the cooling pipelines are disposed on a surface of the battery module.

* * * * *